May 25, 1943.                  J. LODER                  2,320,091
            PRICE COMPUTING AND INDICATING MECHANISM
                   Filed Jan. 18, 1940           2 Sheets-Sheet 1

Inventor,
J. Loder

By: Glascock Downing & Seebold
                                        Attys

May 25, 1943.  J. LODER  2,320,091
PRICE COMPUTING AND INDICATING MECHANISM
Filed Jan. 18, 1940  2 Sheets-Sheet 2

Inventor,
J. Loder
By: Glascock Downing & Seebold
Attys.

Patented May 25, 1943

2,320,091

UNITED STATES PATENT OFFICE 2,320,091

PRICE COMPUTING AND INDICATING MECHANISM

Johan Loder, Wassenaar, Netherlands; vested in the Alien Property Custodian

Application January 18, 1940, Serial No. 314,552
In the Netherlands January 21, 1939

3 Claims. (Cl. 235—61)

This invention relates to registering apparatus for computing and indicating the total price of a measured quantity of liquid, such as gasoline, which is dispensed to a purchaser, for instance, at a filling station. More particularly it relates to registering apparatus comprising a variable speed gear so as to enable the registry of total prices based on different prices per unit amount (for instance gallon) of the liquid.

In order that my invention may be fully understood by those skilled in the art, I shall now proceed to describe the same with reference to the annexed more or less diagrammatic drawings, in which.

Figure 1:
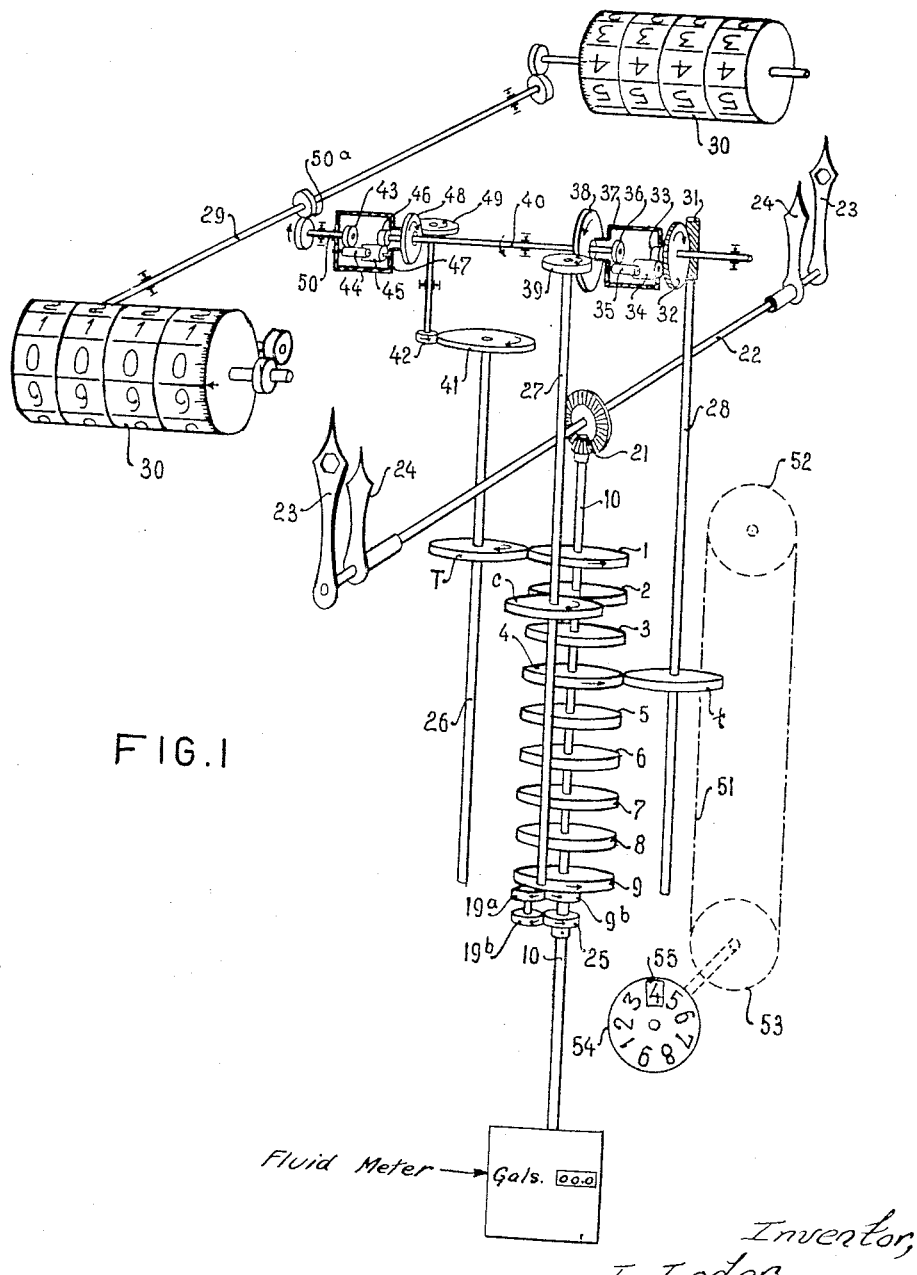
Fig. 1 is a perspective view of one embodiment of the invention.

Referring to the drawings, 10 denotes the main driving shaft, which itself is driven by the liquid measuring device diagrammatically shown in Fig. 1 and designated "Fluid Meter" and is connected, through a suitable gear symbolized by the bevel gears 21, to a shaft 22 operating the gallon indicator pointers 23, 24 indicating, on dials (not shown) provided both on the front and on the rear side of the apparatus, the amount of liquid dispensed.

Figure 2:
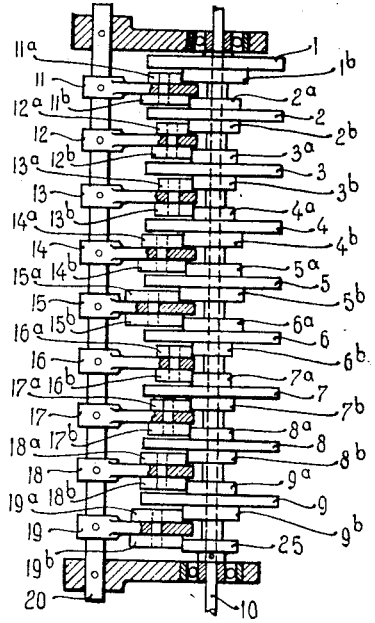
Fig. 2 is an elevational view, partly in section, of details not shown in Fig. 1.

Mounted for individual rotation on the main shaft 10 are nine identical gears 1—9. Gear 1 is integral with a smaller coaxial gear 1b (Fig. 2). Gears 2 to 9 inclusive are each integral with two smaller coaxial gears 2a, 2b—9a, 9b, respectively. Extending parallel to the main shaft 10 is an auxiliary shaft 20 secured to which are nine arms 11—19. Journaled to each of these arms is a set of two co-axial pinions 11a, 11b,—12a, 12b—19a, 19b, the pinions of each pair being mounted for rotation in unison. Pinion 11a meshes with gear 1b, pinion 11b meshes with gear 2a, and so on, it being understood, however, that pinion 19b engages a gear 25 fixed on the main shaft 10.

The numbers of teeth of the intermeshing gears 11a, 1b and so on are so chosen that the ratio of the speeds of the gears 1, 2—9 is as 1:2:—:9. To this end, the intermeshing gears 11b, 2a and so on may for instance have equal numbers of teeth, whereas the intermeshing gears 11a, 1b and so on have transmission ratios of 1:2, 2:3,—8:9.

Figure 3:
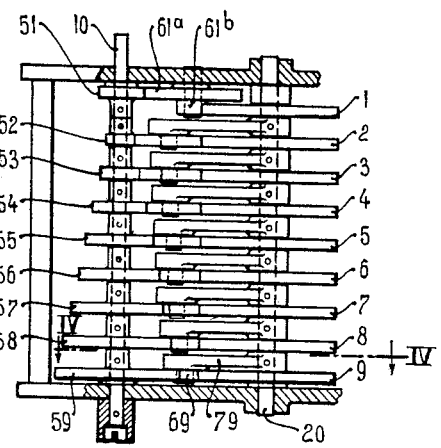
Fig. 3 is a similar view of a modified form of the details shown in Fig. 2.
Figure 4:
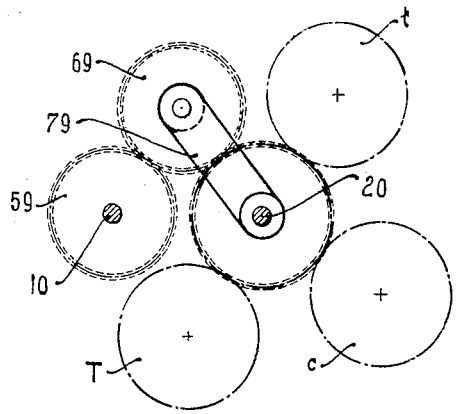
Fig. 4 is a sectional view taken on the line IV—IV in Fig. 3.

In the embodiment shown in Figs. 3 and 4, the gears 1, 2—9 are individually rotatable about the shaft 20 and connected, through intermediate pinions of which pinion 69 only is shown in Fig. 4, with gears 51, 52—59, respectively, which are fixed on the driving shaft 10 operated by the measuring device. The intermediate pinions are each carried by an arm secured to shaft 20. One of these arms, which have different lengths, is shown in Fig. 4 and indicated by the numeral 79.

Gear 51 is operatively associated with gear 1 through two coaxial intermediate pinions 61a and 61b. Also in this embodiment, the ratio between the speeds of wheels 1, 2—9 is as 1:2:—:9.

Extending parallel to the shaft 10 (Fig. 1) are three shafts 26, 27 and 28, on which are slidably but non-rotatably mounted a gear T for tens of dollar cents, a gear c for cents and a gear t for tenths of cents, respectively. Thus, each of the gears T, c and t can be brought to cooperate with each of the gears 1—9.

In the position shown, the mechanism is set for a price of 12.4 cents per unit volume of liquid.

The revolutions of gears T, c and t are totalized and transmitted, in accordance with the money value represented thereby, to a shaft 29, which actuates two counters 30 of any suitable or conventional construction. The operation of this totalizing device is as follows:

Shaft 28 of the tenths carries at its upper end a worm 31 engaging, with a reduction of 1:10, a worm wheel 32. The latter is integral with a gear 33 driving, through pinions 34 and 35, a gear 36 fixedly mounted on a shaft 40. Pinions 34 and 35 are rotatably mounted in a casing 37, which is integral with a gear 38 meshing with a gear 39 secured to the upper end of the cent shaft 27.

The gears 33 and 36 have equal numbers of teeth. Consequently, and assuming the casing 37 to be arrested, shaft 40 will rotate at the same speed as gear 32, but in reverse direction. If, however, gear 33 is arrested and gear 38 is rotating in the direction indicated by the arrow, pinion 34 will roll on gear 33, so that with each revolution of gear 38, gear 40 makes two revolutions in the same direction. Thus, with a view to correct computation, the transmission ratio between the gears 39, 38 will have to be as 2:1.

If both the gear 33 and the gear 38 rotate, the shaft 40 will be rotated at a speed corresponding to the sum of the separate speeds. Similarly, the revolutions of shaft 40 and half the revolutions of gear 48 are totalized by parts 43—47, which correspond to the parts 33—37 but are mounted in the reverse sequence.

The revolutions of the tens shaft 26 are transmitted, in a ratio of 1:10, to a shaft 50 through gears 41, 42 having a transmission ratio 5:1, and through gears 49, 41 having a transmission 1:1 (instead of the transmission ratio 2:1 of the gears 39, 38).

Shaft 50 is connected, through screw gears 50a, with shaft 29 for actuating the counters 30, 30.

The unit price for which the gears T, c and t are set is made visible in a way which, for the sake of clearness, is shown only for gear t. This gear is suspended from a chain 51 passing over two sprocket wheels 52 and 53. Wheel 53 is connected to a disk 54 exhibiting the numerals 1 to 9 inclusive, in such a way that always the numeral of the gear with which the gear t is in registry (i. e., gear 4 in Fig. 1) appears in a window 55 of the casing (not shown) enclosing the mechanism.

What I claim is:

1. In fluid dispensing apparatus including means for computing and indicating the price of a measured quantity of fluid, a main shaft, a number of equal size main gears mounted for individual rotation on said main shaft, a driving shaft driven by a fluid meter, means for coupling said main gears with said driving shaft in predetermnied transmission ratios, a secondary gear, means adapted to selectively bring said secondary gear into mesh with each of said main gears, a counter, and means for transmitting the revolutions of the secondary gear in accordance with the money value represented thereby to said counter.

2. In fluid dispensing apparatus including means for computing and indicating the price of a measured quantity of fluid, a main shaft, a number of equal size main gears mounted for individual rotation on said main shaft, a driving shaft driven by a fluid meter, means for coupling said main gears with said driving shaft in predetermined transmission ratios, a plurality of secondary shafts mounted in parallel relation with the main shaft, a plurality of secondary gears slidable on but arranged to transmit rotary movement to each of said secondary shafts, means adapted to selectively bring each of said secondary gears into mesh with each of said main gears, a counter, and means for totalizing the revolutions of said secondary shafts in accordance with the money value represented thereby and transmitting the total to said counter.

3. In fluid dispensing apparatus including means for computing and indicating the price of a measured quantity of fluid, a main shaft, a number of equal size main gears mounted for individual rotation on said main shaft, a driving shaft driven by a fluid meter, means for coupling said main gears with said driving shaft in predetermined transmission ratios, a plurality of secondary shafts mounted in parallel relation with the main shaft, a plurality of secondary gears slidable on but arranged to transmit rotary movement to each of said secondary shafts, means adapted to selectively bring each of said secondary gears into mesh with each of said main gears, and means for totalizing the revolutions of said secondary shafts in accordance with the money value represented thereby.

JOHAN LODER.